United States Patent [19]

Rim

[11] Patent Number: 5,019,972
[45] Date of Patent: May 28, 1991

[54] CONTROL METHOD FOR AN AUTOMATIC BREAD BAKING MACHINE

[75] Inventor: Jong S. Rim, Suweon, Rep. of Korea

[73] Assignee: Sam Sung Electronic Co. Ltd., Seoul, Rep. of Korea

[21] Appl. No.: 363,973

[22] Filed: Jun. 9, 1989

[30] Foreign Application Priority Data

Jun. 9, 1988 [KR] Rep. of Korea .............. 6874/88

[51] Int. Cl.$^5$ ............................................. G06F 15/20
[52] U.S. Cl. ................................. 364/400; 99/331; 219/494; 364/557
[58] Field of Search ............... 364/140, 141, 400, 557, 364/550, 551.01, 477; 219/492, 494, 501; 73/169; 99/348, 331, 332, 333, 325, 486; 366/144, 145, 146, 98, 601; 426/231, 232, 233, 503, 504, 523

[56] References Cited

U.S. PATENT DOCUMENTS

4,766,766 8/1988 Ahlert et al. ............... 364/550 X
4,775,542 10/1988 Manser et al. .............. 364/555 X
4,782,445 11/1988 Pasquini ..................... 364/400

Primary Examiner—Joseph Ruggiero
Attorney, Agent, or Firm—Sterne, Kessler, Goldstein & Fox

[57] ABSTRACT

In an automatic bread baking machine, a temperature detecting circuit and a control method thereof detect the change of a temperature during the baking of bread. According to temperature programming, a microprocessor outputs from its output terminals a high signal in a defined order onto numerous resistors. The resistors have predetermined resistor values different from each other. A temperature sensor is connected in common to the resistors. Moreover, a comparator compares the voltage across the temperature sensor to the comparator's reference voltage. The output of the comparator is connected to and monitored by the microprocessor. Consequently, the temperature detecting circuit and the control method allow for the elimination of an A/D convertor and the self-diagnostic functions for a thermistor.

2 Claims, 7 Drawing Sheets

CONTROL METHOD FOR AN AUTOMATIC BREAD BAKING MACHINE

BACKGROUND OF THE INVENTION

The present invention is related to providing a method for controlling a temperature detecting circuit of an automatic bread baking machine for detecting the change of the temperature according to the advancement of the bread baking procedure, for example kneading the ingredients of the bread (the dough), fermenting the dough twice and baking the dough to automatically produce the bread.

Figure 1:
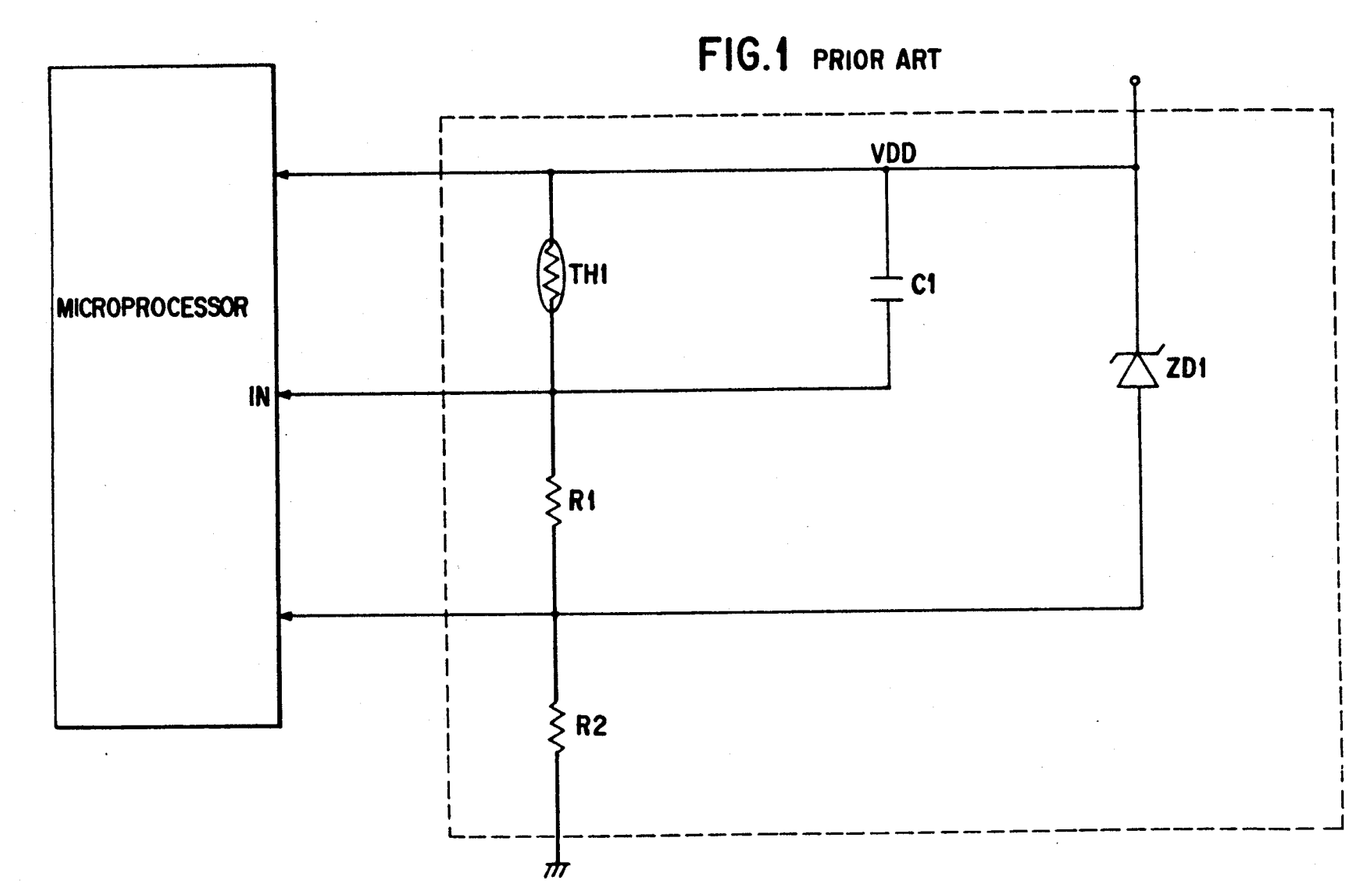
FIG. 1 is a conventional temperature detecting circuit of an automatic bread baking machine.

A conventional automatic bread baking machine has been two types using a microprocessor provided with a functioning means for converting the analog signal into the digital signal therein and a microprocessor not having said signal conversion function in order to detect the temperature of a bread baking machine. But, in case of using a microprocessor not having said signal conversion function, a temperature detecting circuit and a analog/digital converter are connected to a microprocessor to detect the temperature, said circuit and converter are generally complex and their manufacturing cost is very high. Also, if using a microprocessor having said conversion function, the typical example is as follows;

As shown in FIG. 1, microprocessor 1 is provided with a temperature detecting circuit including thermistor TH1, resistors R1 and R2, condenser C1 and constant voltage zener diode ZD1. Therefore, as the resistance value of thermistor TH1 is varied respective to the temperature change, the voltage applied to input terminal IN of microprocessor 1 is changed to detect the temperature, but even though this machine did not use a expensive analog/digital converter, a microprocessor having the conversion function is more expensive than that not having the conversion function. Due to such factor, manufacturing cost is increased, while if microprocessor 1 is masked according to the determination of the temperature data based on the voltage received at input terminal IN, the temperature data must not change dependent upon the abnormal condition. Also, if a mechanism configuration of the product or the type of a thermistor is to be changed, voltages input according to the temperature change are different from each other. Therefore, the temperature data as to the voltage must be changed, and then a microprocessor must be newly masked again. As a result, the determination of the temperature data in connection with the input voltage following after the development of the new products is required, and much time and cost required for developing the products are needed.

Figure 2:
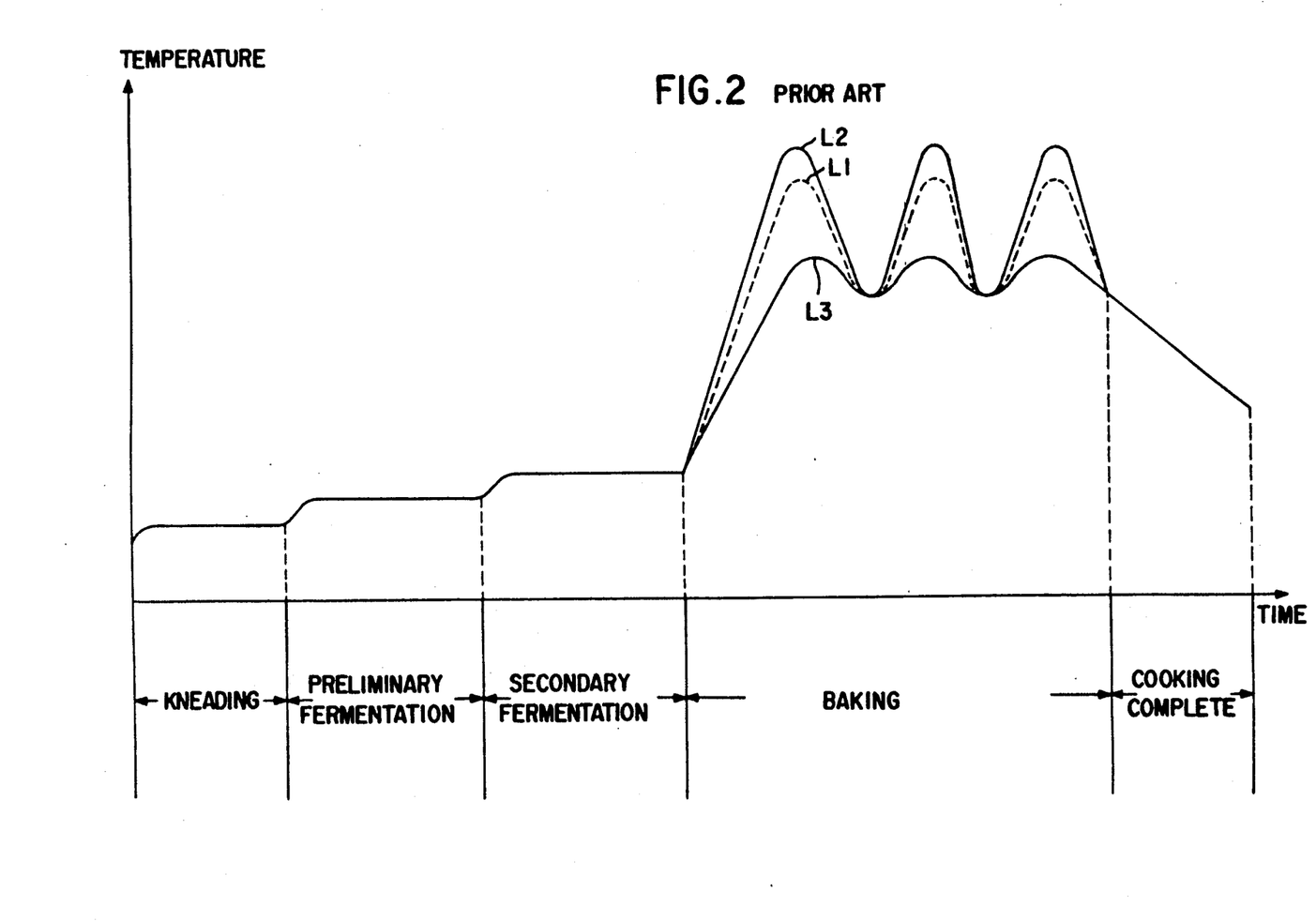
FIg. 2 is a graph showing the changing of the temperature according to the percedure for performing the baking of the bread by a conventional bread baking machine.

Such a conventional automatic bread baking machine was operated based on the temperature curve graph shown in FIG. 2 to perform the baking of the bread. That is to say, if it firstly executes kneading of the bread ingredients, preliminary fermenting of the dough, secondary fermenting of the dough and then baking of the fermented bread, baking of the bread was performed 2-3 times based on the standard temperature curve L1 or based on the standard temperature curve L1, the high temperature curve L2 and the low temperature curve L3 according to the selection of the baking level by operating the key matrix, but it has been disadvantages that due to the assembling errors of the mechanical parts and the errors of the circuit elements mounted in the automatic bread baking machine, the condition of the bread baking as not operated in uniform while three selections as described above could not satisfy various tastes of the consumer.

The typical example in U.S. Pat. No. 4,538,509 issued to Shin Ojima, You, etc. entitled "AUTOMATIC BREAD BAKING MACHINE". This patent includess a control portin provided with a microprocessor for adjusting the temperature in order by the timing control on the basis of the temperature which at least one sensors mounted into a baking container and a kneading bar detect.

SUMMARY OF THE INVENTION

The present invention comprises a method for controlling a temperature detecting circuit of an automatic bread baking machine for adjusting the temperature according to the programming stored in a microprocessor and performing the baking of the bread, in which a microprocessor is provided with at least one terminals connected to thermistors through at least one resistors having the values different from each other so as to detect the voltage corresponding to the temperature sensed by a thermistor, a comparator compares the detecting voltage with the refernce voltage to output the comparing signal to a microprocessor.

Also, the present invention comprises a method for controlling a temperature detecting circuit with a microporcessor having two routines which are the temperature value detecting routine and the abnormal detecting routine of a thermistor, in which one routine includes steps for shifting the output buffer by one bit and outputting the high signal from the output terminal till receiving the low signal from the input terminal, while adding the signal 1 to the buffer to store it as the temperature data, and the other routine includes steps for judging whether the value stored in the storing buffer is 0 to 6 after performing said routine only in the case that any start key is pressed to determine whether the thermistor is abnormal, and then stopping the bread baking machine if the thermistor is abnormal.

Accordingly, the main object of the present invention is to a method for controlling a temperature detecting circuit with a microprocesor not having the conversion function and to reduce the cost for manufacturing the products.

The other object of the present invention is to reduce the developing time and cost for determining the temperature data needed in charging the type of the products; when the type of the products is changed, the data in connection with the temperature can be easily changed by changing the factors outside a microprocessor.

Another object of the present invention is to judge whether a temperature detecting circuit can accurately sense the temperature based on detecting the shorting condition or the cutting off condition of a thermistor at the initial operation for performing the baking of the bread, thereby preventing the error operation of the bread baking machine.

Another object of the present invention is to bake the bread adjusting darkness and the thickness of the crust of the bread to satisfy user's taste with result that the baking temperature is continuously controlled during the baking of the bread.

BRIEF DESCRIPTION OF DRAWINGS

The above and other objects of the present invention will be seen in the following description taken in connection with the accompany drawings, in which.

DETAILED DESCRIPTION OF THE INVENTION

The above objects and advantages of the present invention will be explained in detail below with reference to FIG. 3 to FIG. 7.

Figure 3:
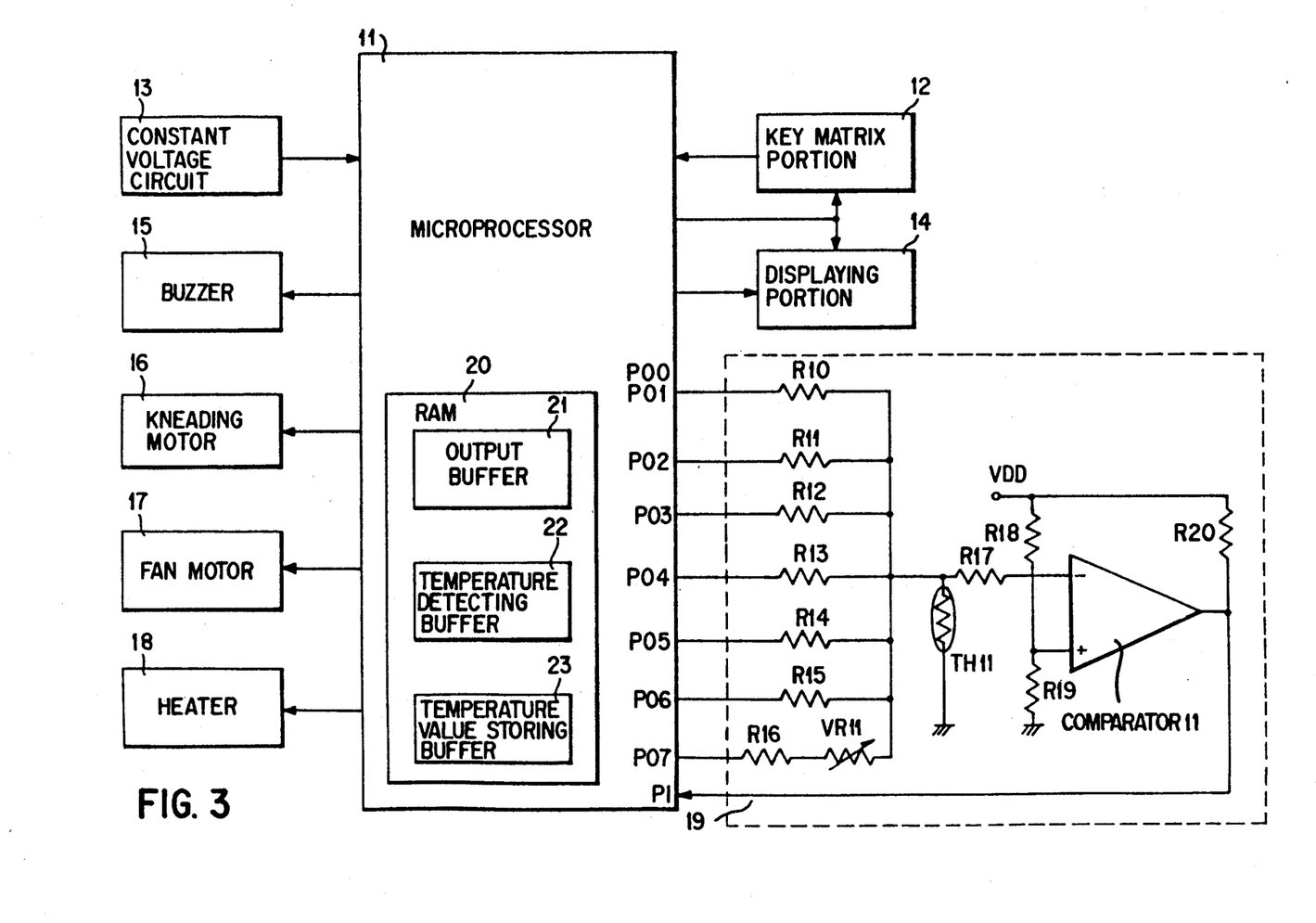
FIG. 3 is a temperature detecting circuit of an automatic bread baking machine for performing a method of the present invention.

FIG. 3 is a circuit of the automatic bread baking machine according to the present invention.

A control circuit of the automatic bread baking machine is provided with microprocessor 11 for controlling the overall operation of the automatic bread baking machine according to the output signal of key matrix 12; constant voltage circuit for supplying the operating voltage to the parts or elements of the control circuit; displaying portion 14 for displaying the time, the procedure to be operated and the abnormal states; buzzer 15 for generating the alarm sound; kneading motor 16 for kneading the ingredients of the bread; fan motor 16 for circulating the air; heater 18 for baking the dough; and, temperature detecting circuit 19 for sensing the temperatue of the bread baking container.

Temperature detecting circuit 19 is provided with resistors R10–R15 connected to output terminals PO1–PO6 for outputing the signal of output buffer 21, which is mounted in RAM 20 of microprocessor 11. Output terminal PO7 is simultaneously connected through resistor R16 and variable resistor VR11 for adjusting the baking temperature to thermistor TH11 along with output teminals PO1-PO6. This connection point between resistors and thermistor TH11 is connected through resistor R17 to the inverting terminal (−) of comparator CCMP11. The non-inverting terminal (=) of Comparator CCMP11 is connected to the connection point between resistors R18 and R19 which is coupled in series to power source VDD to set the reference voltage. The output terminal of comparator CCMP11 is connected to the input terminal PI of microprocessor 11 along with resistor R20 to which power source VDD is applied.

As described above, temperature detecting circuit 19 uses seven terminals consisting output terminals PO1–PO7 in microprocessor 11, but in the preferred embodiment of the present invention numbers of output terminals PO1–PO7 can be changeable according to the temperature range for performing the procedure of kneading, preliminary fermenting, secondary fermentating and baking, etc.. The values of resistors R10–R16 are set at the value similar to the resistance value of thermistor TH11 within the scope of the temperature to be controlled. That is, resistor R10 is set at hundreds of ohms to detect the shorting of thermistor TH11 at the range less than 0° C. Resistor R11 is set to detect the lowest temperature during the kneading operation, resistor R12 is set to detect the temperature at perliminary fermenting, resistors R13 and R14 are set to sense the temperature at secondary fermenting and resistors R15 and R16 are respectively set to have the resistance value of the thermistor TH11 corresponding to the baking temperature. Resistors R17 and R18 are set to have the value same to each other to apply the reference voltage of ½ VDD to the non-inverting teminal (=) of comparator CFCMP11.

Figure 4:
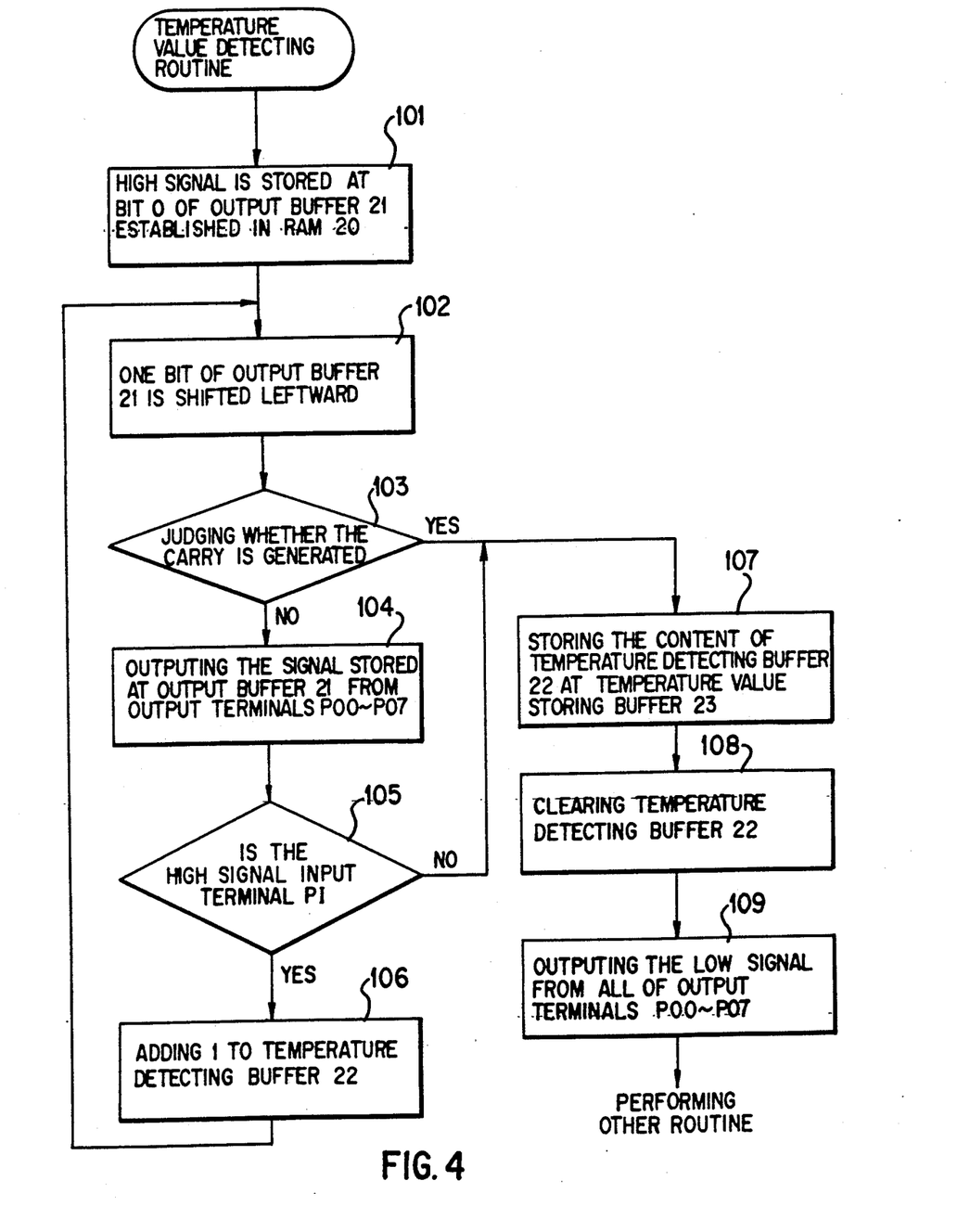
FIG. 4 is a flow chart showing the temperature value detecting routine according to a control method of the present invention.

Such like temperature detecting circuit performs the temperature value detecting routine to sense the temperature value as shown in FIG. 4. Microprocessor 11 sets up output buffer 21 at RAM 20 mounted therein to store the high signal at bit 0 of output buffer 21 at step 101. Step 101 goes step 102 to shift the signal stored at output buffer 21 leftward by 1 and thereafter judge whether the carry has been generated at step 103. At that time, if the carry is not generated, step 103 moves onto step 104 to output the signal stored at each bit of output buffer 21 from outut terminals PO1-PO7, and then to judge whether the high signal is input into the input terminal PI.

In other word, microprocessor 11 outputs the high signal in order to output teminals PO1-PO7. At that time, the high signal divided by values of resistor R10 connected to output teminal PO1 or resistors R11–R15 respectively connected to output terminals PO2–PO7 and the resistance value of thermistor TH11 is applied through resistor R17 to the inverting terminal of comparator CCMP11. Comparator CCMP11 compares the voltage applied to the inverting terminal thereof with the voltage ½ VDD applied to the non-inverting terminal thereof, which the voltage of power source VDD is divided by resistors R18–R19, and outputs the low signal to apply to input terminal PI of microprocessor 11 if the former voltage is more than the voltage ½ VDD. On the contrary, if the former voltage is less than the voltage ½ VDD, comparator CCMP11 outputs the high signal to apply to input terminal PI.

On the other hand, the values of resistors R10–R16 respectively connected to output terminals PO1–PO7 are set at the value same as the resistance value according to the detecting temperature of thermistor TH11. For example, assuming that when each of tempratures is below 0° C., 25° C., 32° C., 34° C., 38° C., 130° C and 170° C., each of resistance values of thermistor TH11 is 500 KΩ, 200 KΩ, 160 KΩ, 140 KΩ, 120 KΩ 8 KΩ and 4 KΩ, the values of resistors R10–R16 are respectively 500 Ω, 200 Ω, 160 Ω, 140 Ω, 120 Ω, 8 Ω and 4 Ω to be same as the resistance value of Thermistor TH11. Therefore, assuming that the temperature at the present is below 25° and the resistance value of thermistor TH11 is more than 200 KΩ, if microprocessor 11 outputs the high signal from output terminal PO1 at step 104, the voltage applied to the inverting terminal of comparator CCMP11 is less than ½ VDD to force comparator CCMP11 to output the high sighal to input terminal PI of microprocessor 11.

Such as this, if the high signal is input into input terminal PI, microprocessor 11 adds 1 to temperature detecting buffer 22 mounted in RAM 20 at step 106 and then performs step 102 to shift the signal stored at output buffer 21 by 1 bit leftward. Next, at step 104 microprocessor 11 outputs the high signal at output terminal PO4. At that time, thermistor TH11 has the resistance value of more than 200 Ω due to the fact that the temperature is below 25° C. and the voltage applied to the inverting terminal of comparator CCMP11 is over ½ VDD. Thus, comparator CCMP11 outputs the low signal to apply this to input terminal PI.

That is to say, microprocessor 11 shifts in order from output terminals PO1 to PO2, PO3, PO4, PO5, PO6 and PO7 while outputs the high signal until input terminal PI receives the low signal as well as adds this signal to temperature detecting buffer 22. Thereafter, during such operation is repeatedly performed through step 102 to step 106, until the low signal is imput at input terminal PI or the high signal is output from output terminal PO7, the high signal is input into input terminal PI to add by 1 bit to temperature detecting buffer 22, thereby storing 6 at temperature detecting buffer 22. Next, if the carry is generated during the performing of step 102, microprocessor 11 goes on step 107 to store the value, which is stored at temperature detecting buffer 22, at temperature value storing buffer 23. Then, moving on step 108, microprocessor 11 clears the value stored at temperature detecting buffer 22 at initializing step 108 and outputs the low signal from output terminals PO1-PO7 to perform the other routine at step 109.

Therefore, the temperature value detecting routine comprises steps of outputting the high signal in order from output terminal PO1-PO7 until terminal PI receives the low signal; storing the value of the temperature sensed by thermistor TH11; storing the temperature value stored at buffer 22 at temperature value storing buffer 23; controlling the driving of kneading motor 16, the driving of fan motor 17 and the heating of heater 18 to execute the bread baking.

Figure 5:
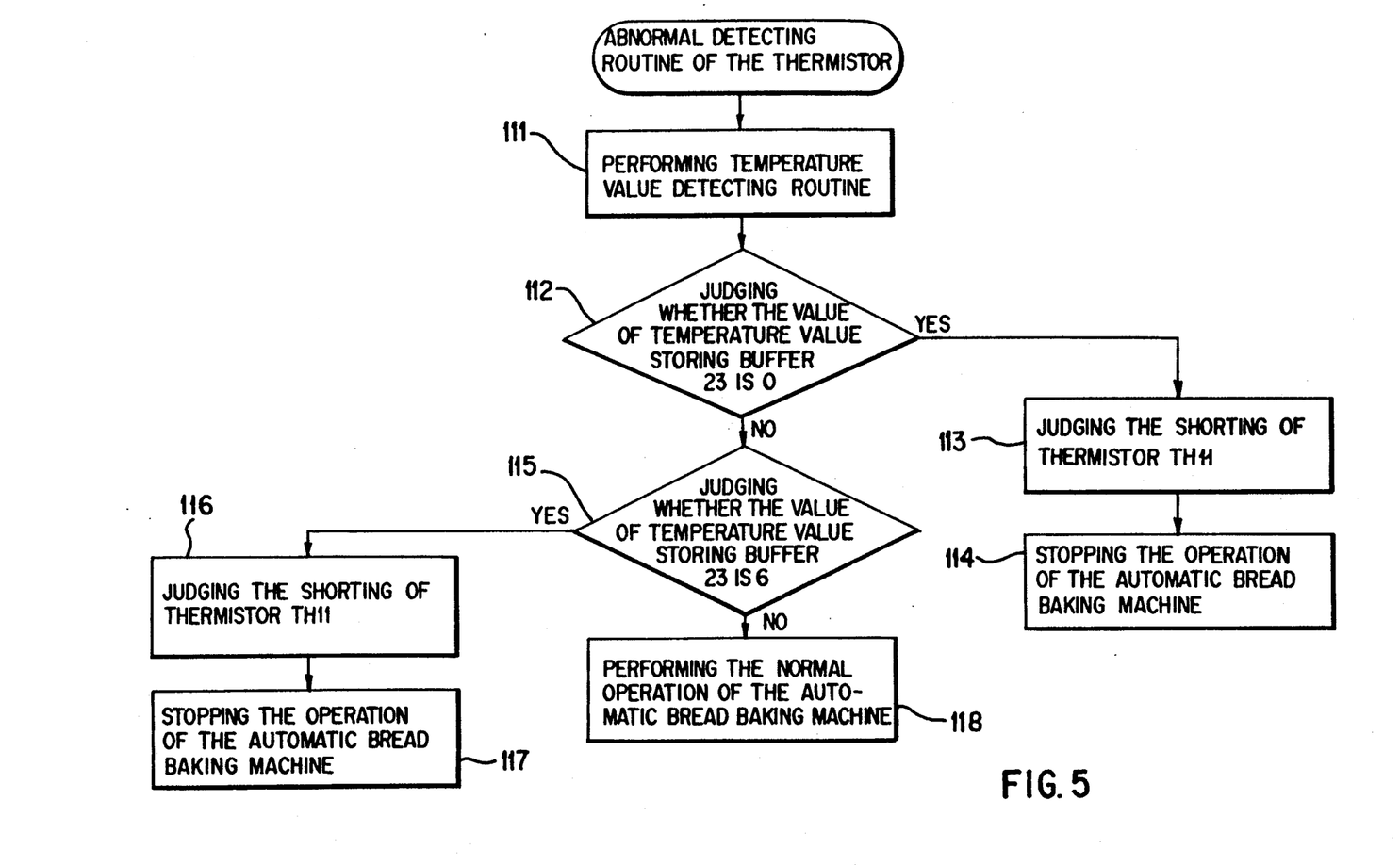
FIG. 5 is a flow chart showing the abnomal detecting routine of a thermistor according to the control method of the present invention.

As to it, when the start key is pressed and the baking of the bread is begun, microprocessor 11 performs the abnormal detecting routine of he thermistor as shown in FIG. 5 and judges whether the thermistor is shorted or cut off to control the operation of the automatic bread baking machine.

That is to say, as shown in FIG. 5, when the start key is pressed microprocessor 11 executes the temperature value detecting routine of FIG. 4 at step 111. Therefore, step 111 moves on to step 112 to judge whether the value stored at temperature value storing buffer 23 is 0, that is, if the high signal is output from output terminal PO1, microprocesor 11 judges whether the low signal is input at input terminal PI. If the stored value is 0, step 112 is moved on to step 113 to judge whether thermistor Th11 is shorted and then stop the operation of the automatic bread baking machine at step 114. Otherwise, if the stored value is not 0, step 112 is gone on to step 115 to judge whether the value stored at temperature value storing buffer 23 is 6. In the other words, microprocessor 11 judges whether the high signal is input into input terminal PI even though the high signal is output from output terminal PO7. If the stored value is 6, step 115 is moved on to step 116 to judge whether thermistor TH11 is shorted, thereby stopping the operation of the automatic bread baking machine. On the other hand, if the value stored at temperature value storing buffer 23 is not 0 6, microprocessor 11 considers as the normal condition of thermistor TH11 to force the automatic bread baking machine to be operated normally.

Then, at the procedure of the bread baking, the temperature is reached up to 170° C. to bake the bread. At that time, if the temperature sensed by therimistor TH11 is over 170° C., microprocessor 11 considers as the temperature of more than 170° C. to force heater 18 to stop heating, with results that the value stored at temperature value storing buffer 23 is 6. If the temperature of thermistor TH11 is below 170° C., microprocessor 11 considers as the temperature of less than 170° C. to force heater 18 to continuously heat up to 170° C., with results that the value stored at temperature value storing buffer 23 is 5.

Herein, it is known that the present invention can adjust the darkness and the thickness of the bread curst, with results that the baking temperature of the bread is changeable by about $+/-10°-20°$ C according to the operation of variable resistor VR11 if the combined resistance value of the resistance value at the center position of variable resistor VR11 and resistor R16 is set at 4 kΩ which is the resistance value at the bread baking temperature of 170° C. sensed by thermistor TH11.

Figure 6:
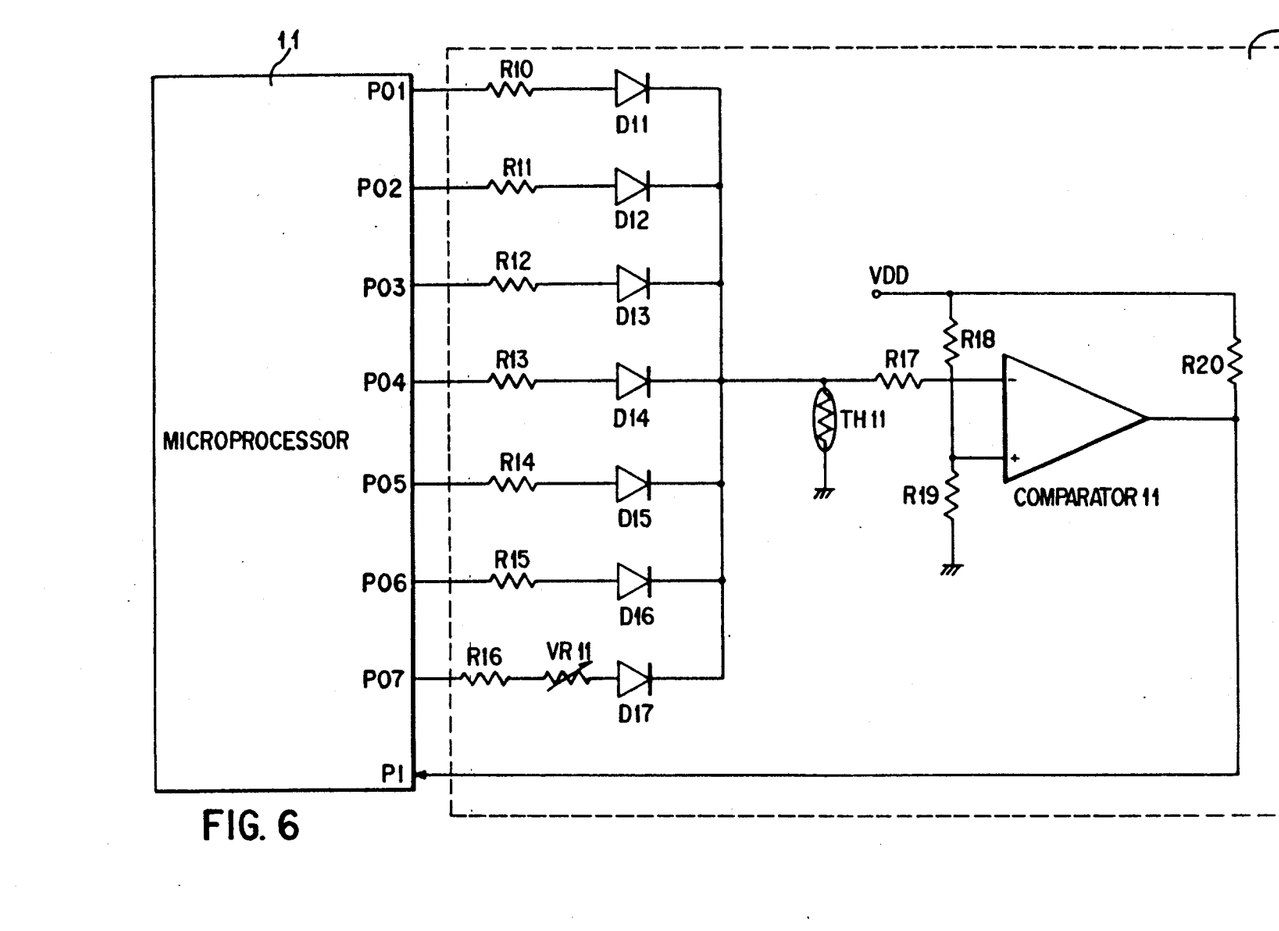
FIG. 6 is a circuit showing the other embodiment of a temperature detecting circuit according to the present invention.

On the other hand, FIG. 6 is showing another embodiment of temperature detecting circuit 19 according to the present invention. Each of resistors R10-R16 and variable resistor VR11 are respectivly connected through diodes D11-D17 to thermistor TH11 and resistor R17. The other configuration is similar to that of first embodiment.

Such like other embodiment of temperature detecting circuit according to the present invention can prevent the error operation of temperature detecting circuit 19, because if any one of output terminals PO11-PO17 outputs the high sighal selectively, diodes D11-D17 prevent the reversing flow of the current into any one of output terminals PO10-PO17 outputting the low signal.

Figure 7:
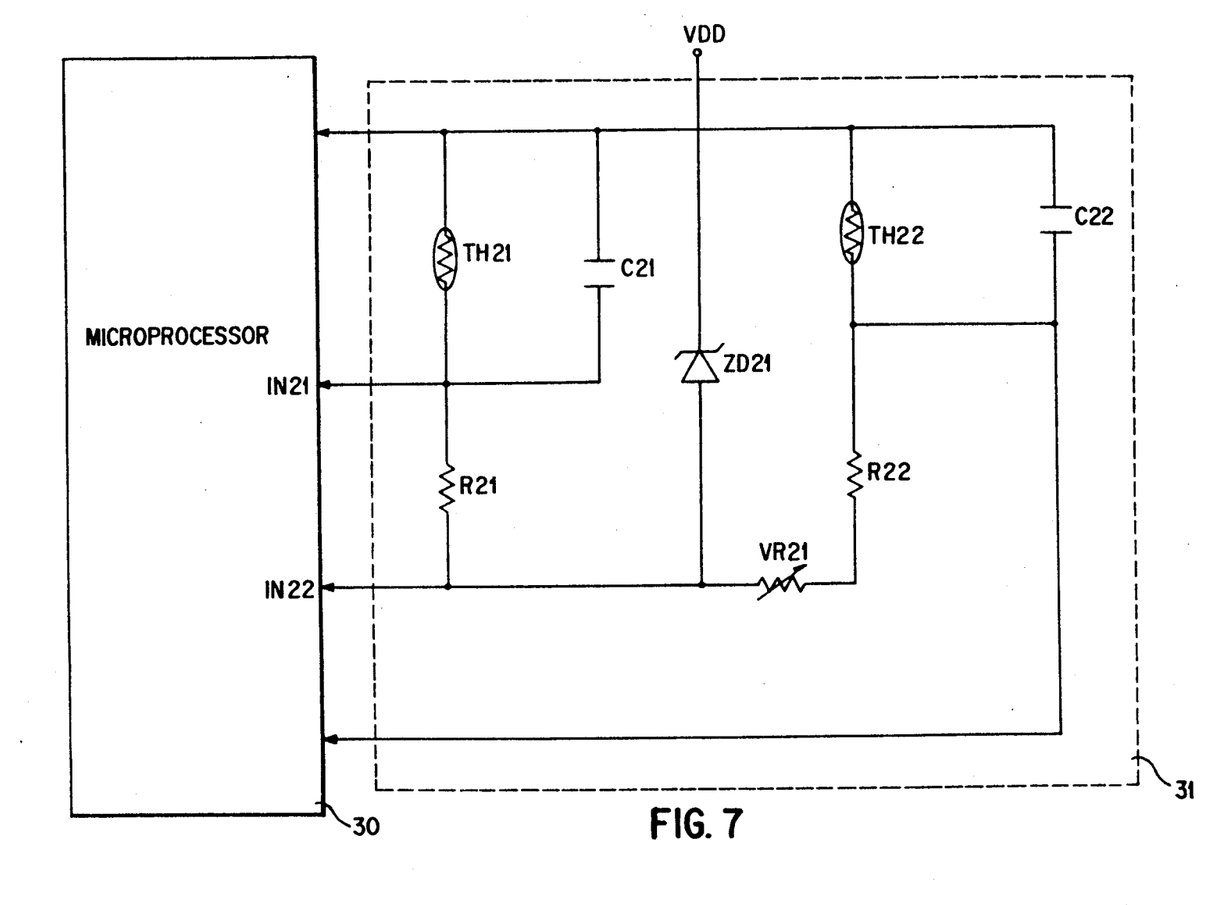
FIG. 7 is a circuit showing other embodiment of the temperature detecting circuit for performing a method of the present invention.

Also, FIG. 7 is another embodiment of the temperature detecting circuit using the microprocessor capable of converting the digital signal into the analog signal according to the present invention. Temperature detecting circuit 31 is provided with thermistor TH21 for sensing the kneading and fermenting temperature, thermistor TH22 for sensing the baking temperature, resistors R21 and R22, condensers C21 and C22, variable resistor VR21 for adjusting the baking temperature and microprocessing 30.

Such like this temperature detecting circuit of another embodiment is operated as folows;

The resistance value of thermistor TH21 is charged according to the temperature sensed thereby, and thus the voltage applied to input terminal IN21 is changed. Thereafter, microprocessor 30 performs the operations of kneading, preliminary fermenting and secondary fermenting. On the other hand, the resistance value of thermistor TH22 is charged according to the temperature sensed thereby, and thus the voltage applied to input terminal IN22 is also charged. Therefore, microprocessor 30 controls the baking temperature to be maintained at 170° C. by the voltage of input terminal IN22. At that time, it is known that variable resistor VR21 connected in series to resistor R22 can vary the baking temperature of the bread by $+/-10°-20°$ C. according to the operation thereof.

As described above, the present invention does not use a relatively expensiver microprocessor having the function for converting the digital signal into the analog signal, but use a relatively cheaper microprocessor not having said function to detect the temperature. Thus, the cost of the products is reduced, and even though when the type of the product is changed simply, the resistance value outsides a microprocesor can be changed. Therefore, the developing time and cost for determining the data of the temperature needed in changing the type of product can be reduced. Further, the error operation of an automatic bread baking machine caused by the abnormal of a thermistor is prevented, because the baking of the bread is performed after judging whether the thermistor can accurately detect the temperature in connection with the abnormal condition thereof. It has the advantage that the baking of the bread can be performed in a way that darkness and the thickness of the bread crust could meet the satisfaction of consumer's taste.

What is claimed is:

1. In an automatic bread baking machine for adjusting the temperature accoding to the programming store in a microprocessor and performing the baking of the bread, a control method of a temperature detecting circuit comprises two routines:

a temperature value detecting routine including the steps of;
   outputting a high voltage signal in order from output terminals of the microprocessor,
   stopping the outputting of a first voltage signal in response to receipt of a second voltage signal at the input terminals;
   storing the vlue of the temperature sensed by a thermistor in a temperature value detecting buffer;
   controlling the driving of the kneading motor and the fan motor and the heating of the heater to preform the baking of the bread in response t the stored values; and a thermistor abnormal detecting routine including the steps of;
   judging whether the value stored in the storing buffer is one of a first or second values after performing said routine only upon starting the bread baking machine to determine whether the theremistor is abnormal, and stopping the baking machine if the thermistor is abnormal.

2. The method of claim 1, wherein said first signal is a high voltage signal.

* * * * *